United States Patent
Hataida et al.

(10) Patent No.: US 8,499,125 B2
(45) Date of Patent: Jul. 30, 2013

(54) CONTROL DEVICE FOR SNOOP TAG

(75) Inventors: Makoto Hataida, Kawasaki (JP);
Toshikazu Ueki, Kawasaki (JP);
Takaharu Ishizuka, Kawasaki (JP);
Takashi Yamamoto, Kawasaki (JP);
Yuka Hosokawa, Kawasaki (JP);
Takeshi Owaki, Kawasaki (JP); Daisuke Itou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1011 days.

(21) Appl. No.: 11/790,272

(22) Filed: Apr. 24, 2007

(65) Prior Publication Data

US 2008/0046664 A1 Feb. 21, 2008

(30) Foreign Application Priority Data

Aug. 18, 2006 (JP) ................. 2006-223626

(51) Int. Cl.
*G06F 12/00* (2006.01)
*G06F 13/00* (2006.01)
*G06F 13/28* (2006.01)

(52) U.S. Cl.
USPC ........................................................ 711/146

(58) Field of Classification Search
USPC ........................................................ 711/146
See application file for complete search history.

(56) References Cited

U.S. PATENT DOCUMENTS

| | | | | |
|---|---|---|---|---|
| 4,695,943 A * | 9/1987 | Keeley et al. | ................. | 711/140 |
| 6,321,301 B1 * | 11/2001 | Lin et al. | ....................... | 711/137 |
| 6,347,360 B1 * | 2/2002 | Moudgal et al. | .............. | 711/133 |
| 6,401,172 B1 * | 6/2002 | Prudvi et al. | ................. | 711/141 |
| 6,560,675 B1 * | 5/2003 | Aho et al. | ..................... | 711/118 |
| 7,120,745 B2 | 10/2006 | Endo et al. | | |
| 7,383,398 B2 * | 6/2008 | Looi et al. | ..................... | 711/146 |
| 7,590,804 B2 * | 9/2009 | Cheng et al. | .................. | 711/137 |
| 7,779,209 B2 * | 8/2010 | Ishizuka et al. | .............. | 711/146 |
| 7,805,576 B2 * | 9/2010 | Hosokawa et al. | .......... | 711/146 |
| 7,873,789 B2 * | 1/2011 | Ishizuka et al. | .............. | 711/133 |
| 2002/0188821 A1* | 12/2002 | Wiens et al. | .................. | 711/220 |
| 2003/0103451 A1* | 6/2003 | Lutgen et al. | ................. | 370/229 |

(Continued)

FOREIGN PATENT DOCUMENTS

| | | |
|---|---|---|
| JP | 04-071049 | 3/1992 |
| JP | 10-116228 A | 5/1998 |

(Continued)

OTHER PUBLICATIONS

Office Action dated Jul. 28, 2008 in corresponding Korean Patent Application No. 10-2007-0049575 (6 pp including translation).

(Continued)

*Primary Examiner* — Sheng-Jen Tsai
(74) *Attorney, Agent, or Firm* — Fujitsu Patent Center

(57) ABSTRACT

To prevent a decrease in performance of controlling a snoop tag. A queue is stored with REPLACE target WAY information and an index as an entry associated with a REPLACE request received from a processor, the index stored in the queue is compared with an index of a subsequent READ request, and, as a result of the comparison, a process based on the index-coincident READ request is executed with respect to the snoop tag corresponding to a content of a cache memory of the processor. Further, the REPLACE target WAY information of the READ request is replaced with the WAY information in the index-coincident entry within the queue.

11 Claims, 7 Drawing Sheets

U.S. PATENT DOCUMENTS

| | | | |
|---|---|---|---|
| 2003/0135696 A1* | 7/2003 | Rankin et al. | 711/136 |
| 2004/0117558 A1* | 6/2004 | Krick et al. | 711/141 |
| 2006/0179174 A1* | 8/2006 | Bockhaus et al. | 710/22 |
| 2006/0206579 A1* | 9/2006 | Connor et al. | 709/214 |
| 2008/0046656 A1* | 2/2008 | Ishizuka et al. | 711/133 |
| 2008/0046662 A1* | 2/2008 | Hosokawa et al. | 711/146 |
| 2008/0046663 A1* | 2/2008 | Ishizuka et al. | 711/146 |
| 2008/0046695 A1* | 2/2008 | Ishizuka et al. | 712/214 |

FOREIGN PATENT DOCUMENTS

| | | |
|---|---|---|
| JP | 11-102320 | 4/1999 |
| JP | 2001-188705 A | 7/2001 |
| JP | 2002-229852 A | 8/2002 |
| JP | 2004-38807 A | 2/2004 |
| JP | 2006-155080 A | 6/2006 |
| KR | 2000-0028207 | 5/2000 |

OTHER PUBLICATIONS

Extended European Search Report dated Jan. 24, 2008 in corresponding European Patent Application No. 07107239.1 (8 pages).

Japanese Office Action mailed on Jan. 17, 2012 for corresponding Japanese Application No. 2006-223626, with English-language Translation.

* cited by examiner

CONTROL DEVICE FOR SNOOP TAG

BACKGROUND OF THE INVENTION

The present invention relates to control of a cache memory.

With a speedup of a CPU, it is an important factor in terms of improving a capacity of a whole system to efficiently control the cache memory.

In a system having a snoop tag representing (specifying a location of) a copy of the cache memory (which will hereinafter simple be referred to as a cache) built in the CPU, if the WAY to the cache is filled with the data, a READ request due to a cache miss is issued to the system.

At this time, if there is no means by which the CPU notifies the system of REPLACE information showing which WAY is swept out, the system side has no alternative but to determine at its own discretion which WAY to the snoop tag is swept out.

In this case, if the WAY swept out by the CPU is different from the WAY swept out by the system side, a cache miss rate rises resultantly. Herein, a premise is a protocol that independently issues the REPLACE information as another REPLACE request to the system from the CPU. This REPLACE request contains, as its content, not the WAY information but only the address information, whereby the system side can recognize from a result of searching through the snoop tag which WAY should be swept out.

Accordingly, the effect is reduced down to a half unless the REPLACE request is processed earlier than a READ request paired with the REPLACE request, and hence it is required that the REPLACE request be surely processed ahead of the READ request.

Further, if the request is pipeline-processed within the system, a general method is that the read and the write of the snoop tag are processed at different timings from requirements of latency, however, in this case it must be assured that there are none of different accesses to the same index between the read and the write. Namely, a so-called index lock must be done.

Moreover, technologies disclosed in the following Patent documents 1 and 2 are given as prior arts related to the invention of the present application.

[Patent document 1] Japanese Patent Application Laid-Open Publication No. 04-71049

[Patent document 2] Japanese Patent Application Laid-Open Publication No. 11-102320

SUMMARY OF THE INVENTION

As described above, when the REPLACE request is processed in advance of the READ request paired with the REPLACE request, there is a possibility in which a subsequent READ request is kept waiting due to the index lock of the proceeding REPLACE request. Namely, such a case arises that the access for improving the performance might conversely bring about a decrease in performance, e.g., a decline of the latency.

Such being the case, the present invention provides a technology of preventing the decrease in performance of controlling the snoop tag.

The present invention adopts the following configurations in order to solve the problems.

Namely, a control device of a snoop tag according to the present invention comprises:

a snoop tag retaining unit retaining a snoop tag corresponding to a content of a cache memory of a processor;

a queue stored with REPLACE target WAY information and an index as an entry associated with a REPLACE request received from the processor; and a comparator comparing the index stored in the queue with an index of a subsequent READ request, wherein a process based on the index-coincident READ request is executed with respect to the snoop tag retaining unit.

Further, an information processing system according to the present invention comprises:

a processor including a cache memory;

a memory stored with information; and a control unit performing read/write control between the processor and the memory, the control unit including:

a snoop tag retaining unit retaining a snoop tag corresponding to a content of the cache memory of the processor;

a queue stored with REPLACE target WAY information and an index as an entry associated with a REPLACE request received from the processor; and a comparator comparing the index stored in the queue with an index of a subsequent READ request, wherein a process based on the index-coincident READ request is executed with respect to the snoop tag retaining unit.

If there is no free space in the queue when receiving the REPLACE request, none of the information may be stored in the queue, and the REPLACE request may be invalidated.

If the queue is stored with an entry of the same index when receiving the REPLACE request, none of the information may be stored in the queue, and the REPLACE request may be invalidated.

The entry stored in the queue may be deleted after an elapse of a predetermined period.

The control device may further comprise a replacing unit replacing, as a result of the comparison, the REPLACE target WAY information of the index-coincident READ request with the WAY information of the index-coincident entry within the queue.

If one ECC is organized by the plurality of WAYS to the snoop tags, an ECC syndrome of a REPLACE target WAY of the READ request may be retained and may be corrected, when a process based on the READ request is executed with respect to the snoop tag, corresponding to the process.

The control device may further comprise a replacing unit replacing, if the WAY information retained in the index-coincident entry and the REPLACE target WAY information of a subsequent READ request are not pieces of information of the WAYS organizing the same ECC or are the same WAY information, the WAY information of the READ request with the WAY information retained in the index-coincident entry.

The control device may further comprising a searching unit searching through the snoop tag and thus determining whether or not the WAY information of the READ request exists in the snoop tag, wherein if the WAY information retained in the index-coincident entry and the REPLACE target WAY information of the subsequent READ request are pieces of information of the WAYS organizing the same ECC and if it is determined from a result of the search that the WAY information of the READ request exists in the snoop tag, the correcting unit may correct the ECC syndrome on the basis of a status of the WAY.

The control device may further comprise a searching unit searching through the snoop tag and thus determining whether or not the WAY information of the READ request exists in the snoop tag; and a replacing unit replacing, if the WAY information retained in the index-coincident entry and the REPLACE target WAY information of a subsequent READ request are pieces of information of the WAYS organizing the same ECC and if it is determined from a result of the search that the WAY information of the READ request does not exist in the snoop tag, the REPLACE target WAY information of the READ request with the WAY information retained in the index-coincident entry.

A control method of a snoop tag according to the present invention comprises:

storing, in a queue, REPLACE target WAY information and an index as an entry associated with a REPLACE request received from a processor;

comparing the index stored in the queue with an index of a subsequent READ request; and executing, as a result of the comparison, a process based on the index-coincident READ request with respect to the snoop tag corresponding to a content of a cache memory of the processor.

In the control method of the snoop tag, as a result of the comparison, the REPLACE target WAY information of the index-coincident READ request may be replaced with the WAY information of the index-coincident entry within the queue.

In the control method of the snoop tag, if one ECC is organized by the plurality of WAYS to the snoop tags, an ECC syndrome of a REPLACE target WAY of the READ request may be retained and corrected, when a process based on the READ request is executed with respect to the snoop tag, corresponding to the process.

In the control method of the snoop tag, if the WAY information retained in the index-coincident entry and the REPLACE target WAY information of a subsequent READ request are not pieces of information of the WAYS organizing the same ECC or are the same WAY information, the WAY information of the READ request may be replaced with the WAY information retained in the index-coincident entry.

In the control method of the snoop tag, it may be determined from searching through the snoop tag whether or not the WAY information of the READ request exists in the snoop tag, and if the WAY information retained in the index-coincident entry and the REPLACE target WAY information of the subsequent READ request are pieces of information of the WAYS organizing the same ECC and if it is determined from a result of the search that the WAY information of the READ request exists in the snoop tag, the ECC syndrome may be corrected based on a status of the WAY.

In the control method of the snoop tag, it may be determined from searching through the snoop tag whether or not the WAY information of the READ request exists in the snoop tag, and if the WAY information retained in the index-coincident entry and the REPLACE target WAY information of a subsequent READ request are pieces of information of the WAYS organizing the same ECC and if it is determined from a result of the search that the WAY information of the READ request does not exist in the snoop tag, the REPLACE target WAY information of the READ request may be replaced with the WAY information retained in the index-coincident entry.

According to the present invention, a decrease in performance of controlling the snoop tag can be prevented.

DETAILED DESCRIPTION OF THE PREFERRED EMBODIMENT

A best mode for carrying out the present invention will hereinafter be described with reference to the drawings. A configuration in the following embodiment is an exemplification, and the present invention is not limited to the configuration in the embodiment.

Figure 1:
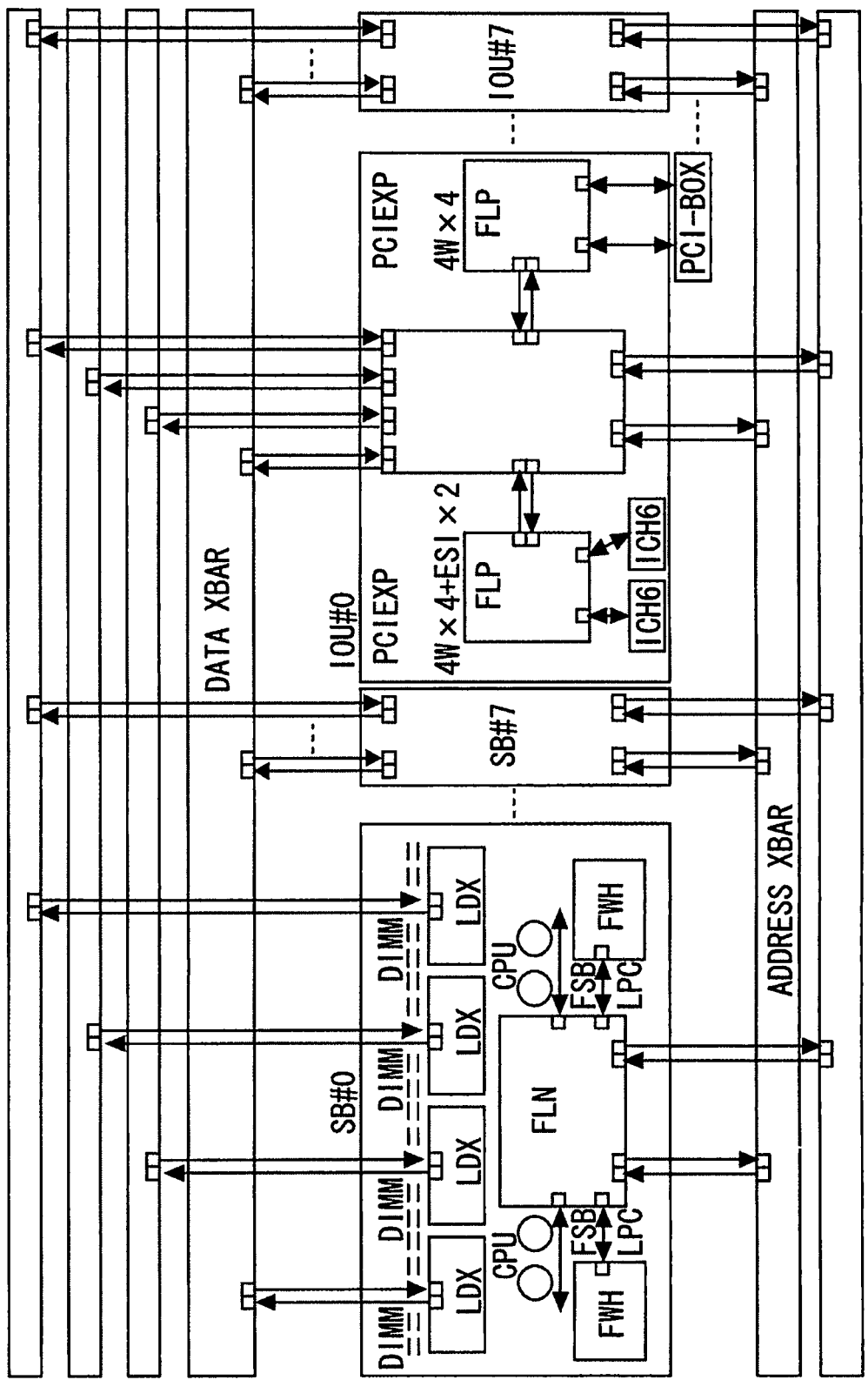
FIG. 1 is a schematic diagram of an information processing system according to the present invention.
Figure 2:
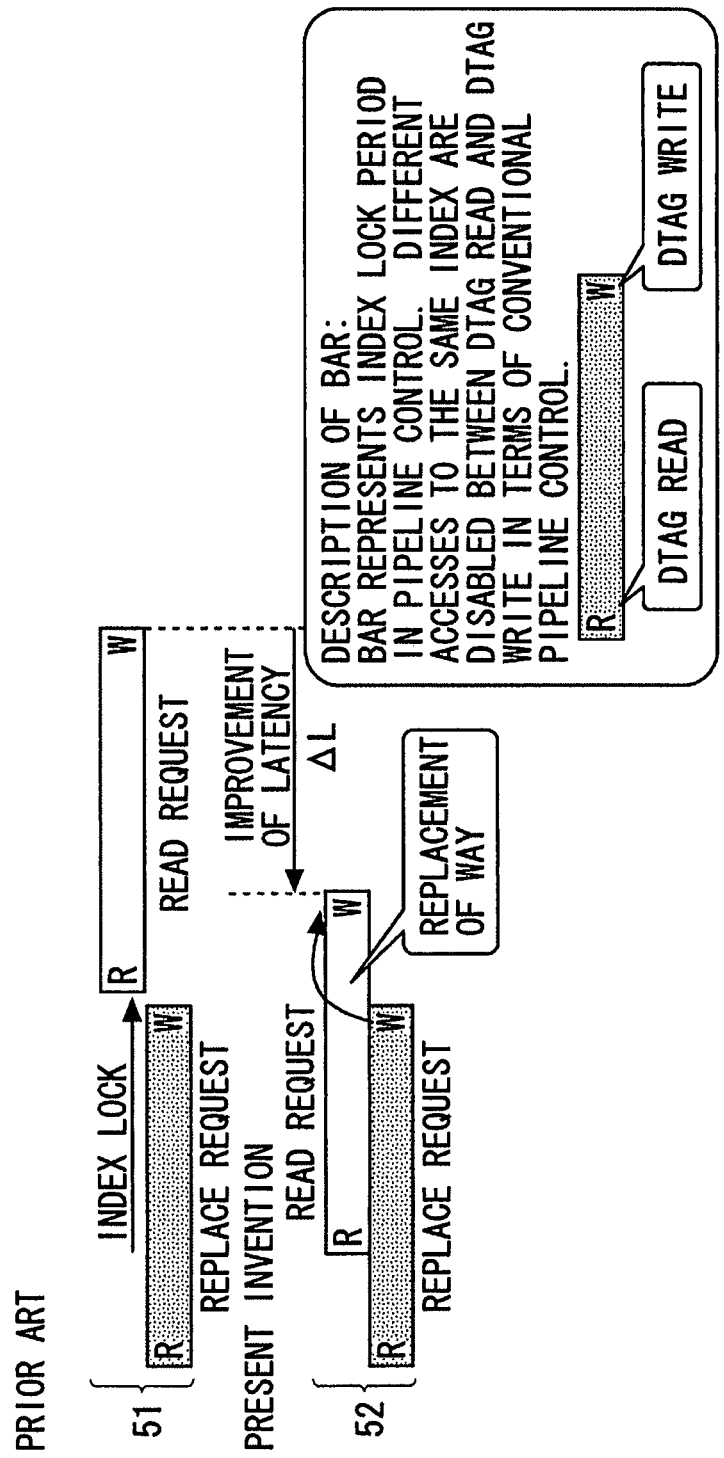
FIG. 2 is a diagram of a comparison between the present invention and a conventional example.
Figure 3:
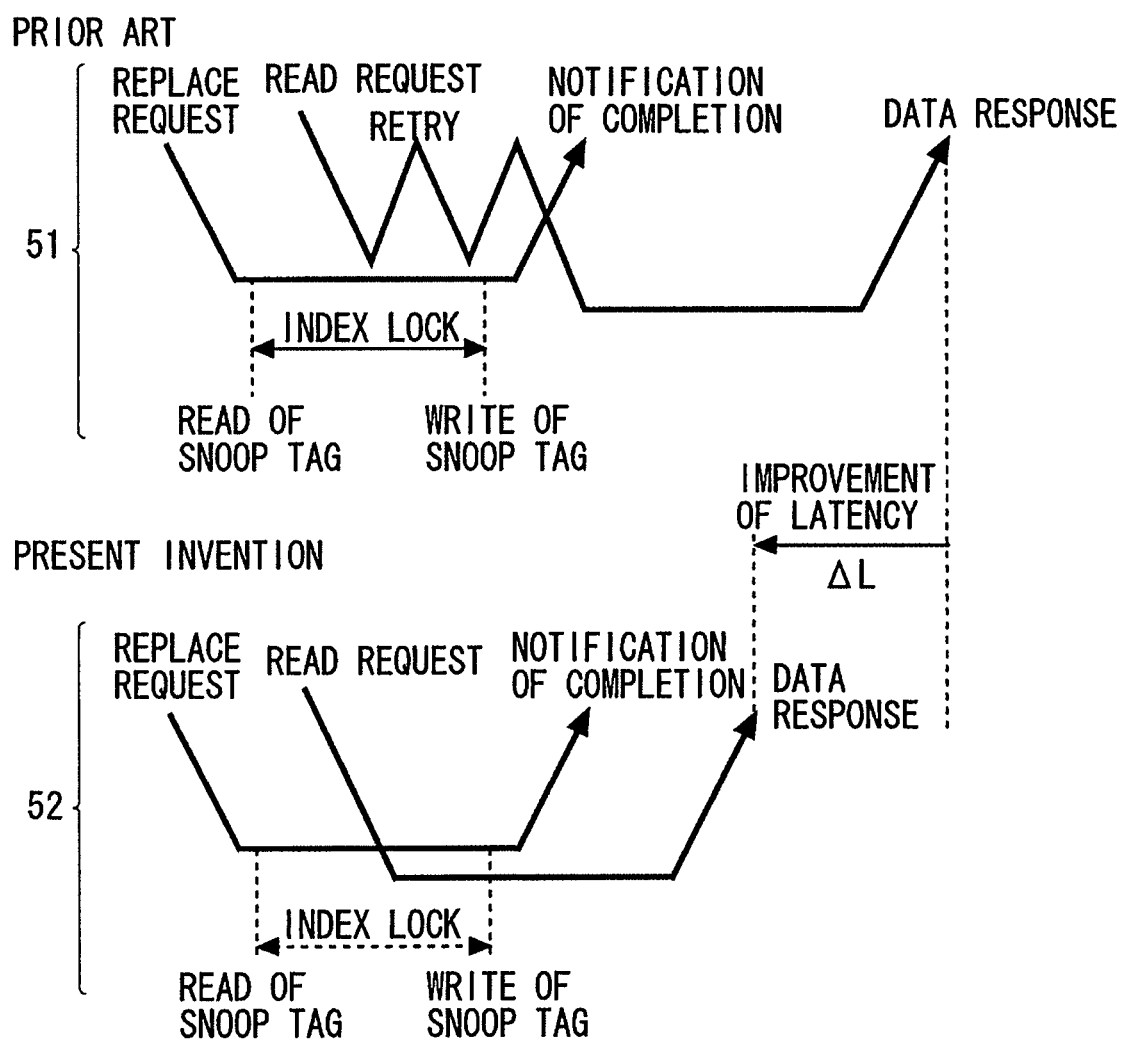
FIG. 3 is a diagram of the comparison between the present invention and the conventional example.
Figure 4:
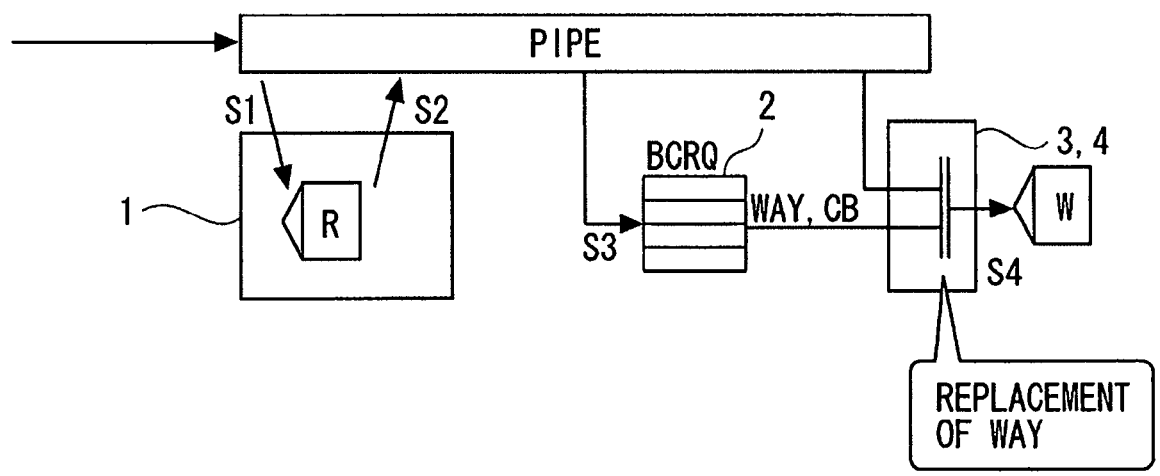
FIG. 4 is a conceptual diagram of the present invention.

FIG. 1 is a schematic diagram of an information processing system according to the present invention, FIGS. 2 and 3 are diagrams showing comparisons between the present invention and a conventional example, and FIG. 4 is a conceptual diagram of the present invention.

An information processing system 10 in the present example is a general-purpose computer including, on a system board SB, CPUs (Central Processing Units), main memories (Dual Inline Memory Modules: DIMMs), etc, and is connected via data crossbars and address crossbars to other system boards SB, I/O control units IOU and I/O controllers FLI.

The system board SB is provided with memory controllers LDX that control the DIMMs, and a request control unit FLN that controls a READ/WRITE request etc between the CPU and the DIMM.

Requests given to the memories and the I/O units etc from the CPUs are temporarily stored (cached) in the request control unit FLN, then internally assigned the order of priority and transmitted onto the address crossbars. The address crossbars arbitrate these requests and thereafter transmit the requests to the FLN/FLI, wherein the FLN/FLI controlling the corresponding memories or I/O units sends data as responses thereto.

The request control unit FLN has a snoop tag 1 representing a copy of the cache built in the CPU.

The CPU, when WAYS to the internal caches are filled with data, issues a READ request due to a cache miss to the request control unit FLN on the system side.

At this time, the CPU, to being with, notifies the request control unit FLN of REPLACE information (a REPLACE request) specifying which WAY is swept out, and subsequently makes a READ request.

In this case, in the conventional system, as shown in a conventional example 51 in FIGS. 2 and 3, till the REPLACE request is written since this REPLACE request has been read, an index is locked, and hence RETRY is repeated without processing the READ request.

Then, when finishing the write of the REPLACE request, the READ request is read and written.

By contrast, the request control unit FLN in the present embodiment, as illustrated in FIG. 4, when the READ request or the REPLACE request given from the CPU enters a pipeline, at first makes HIT determination by searching through the snoop tag (S1), then a result of this determination is sent back to the pipeline, and, after determining an update status of the snoop tag, a content of the determination result is written back again to the snoop tag (S2). Herein, in the case of the REPLACE request, the index and the REPLACE target WAY (REPLACE WAY information) at that time are stored in a queue (BCRQ) 2 (S3), and the REPLACE target WAY for a subsequent READ request is replaced by the REPLACE WAY information of the same index in the queue 2 (S4).

Thus, according to the present invention, when receiving the REPLACE request, the REPLACE request information is saved in the queue 2 while the REPLACE request is interrupted, thereby enabling the READ request of the same index to be immediately processed and scheming to improve a latency by an interval ΔL between the read of this READ request and the write of the REPLACE request as in an example 52 according to the present invention in FIGS. 2 and 3.

Figure 5:
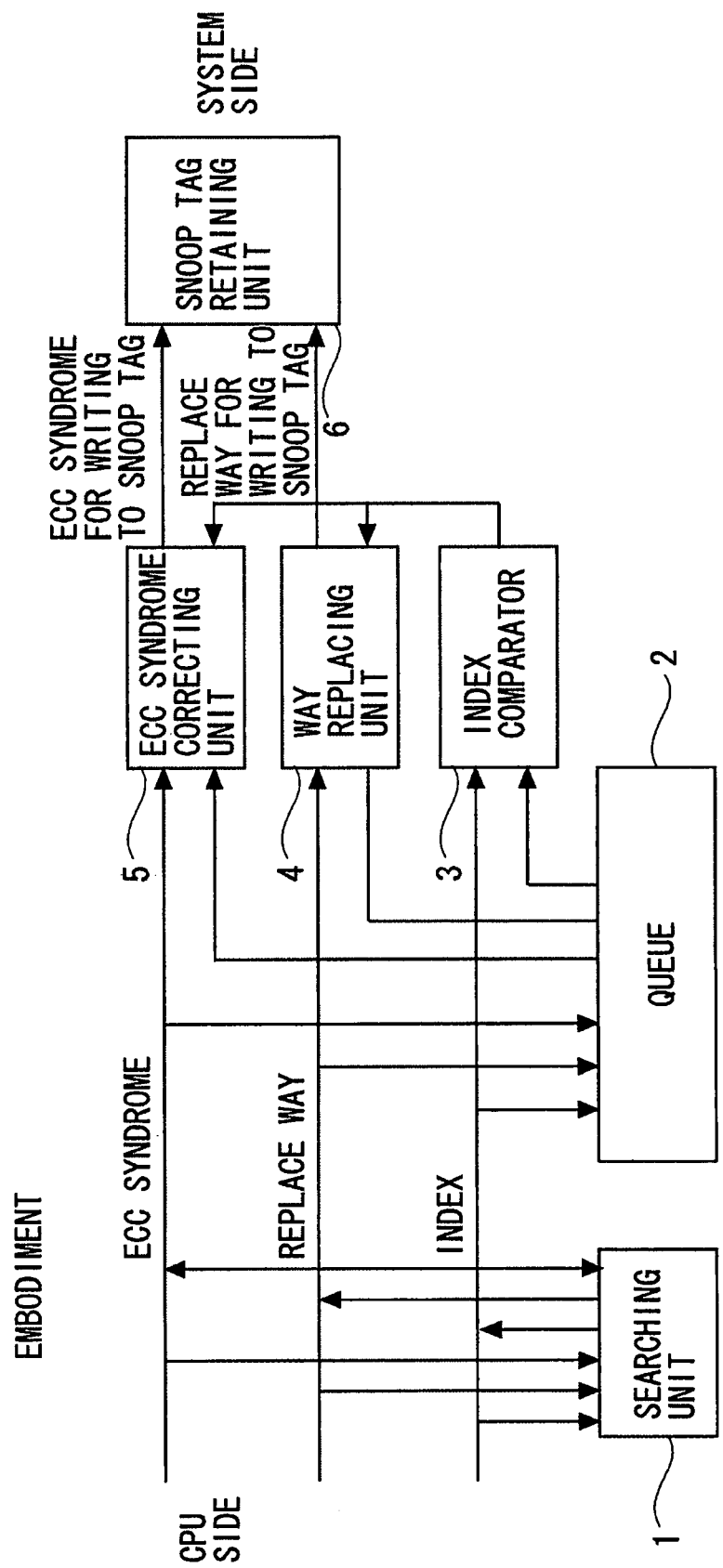
FIG. 5 is a schematic diagram in the present embodiment.
Figure 6:
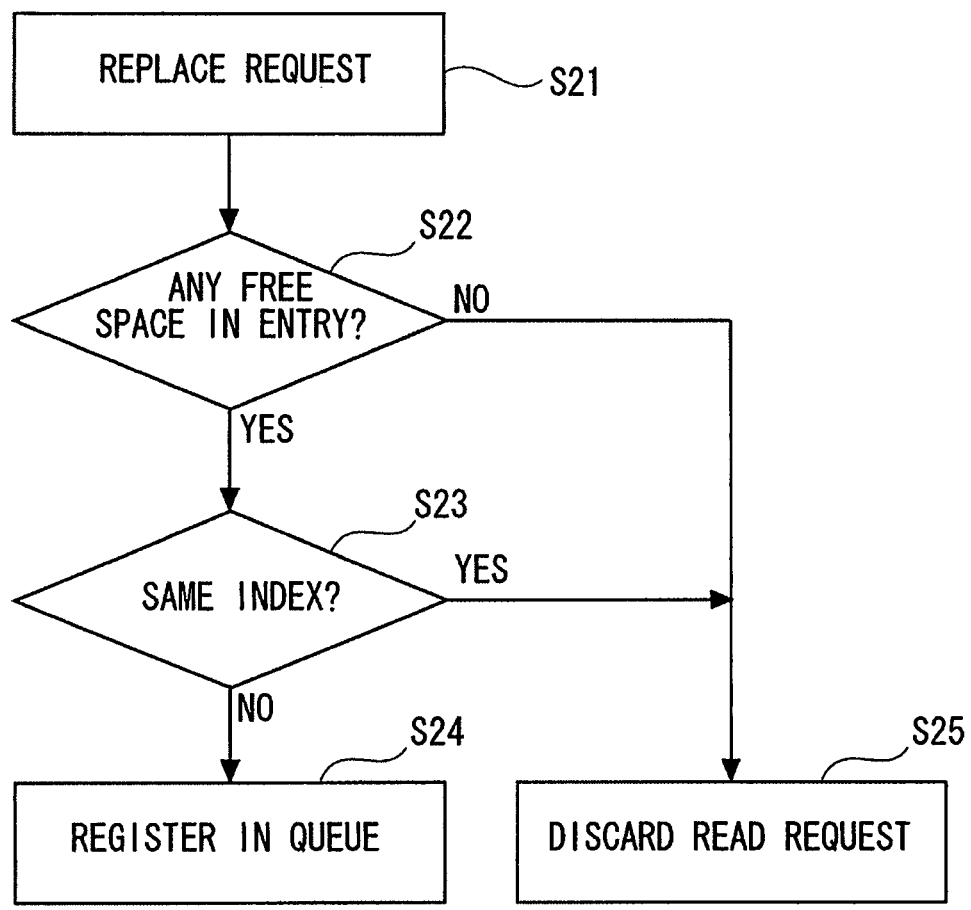
FIG. 6 is an explanatory diagram of a process when receiving a REPLACE request.
Figure 7:
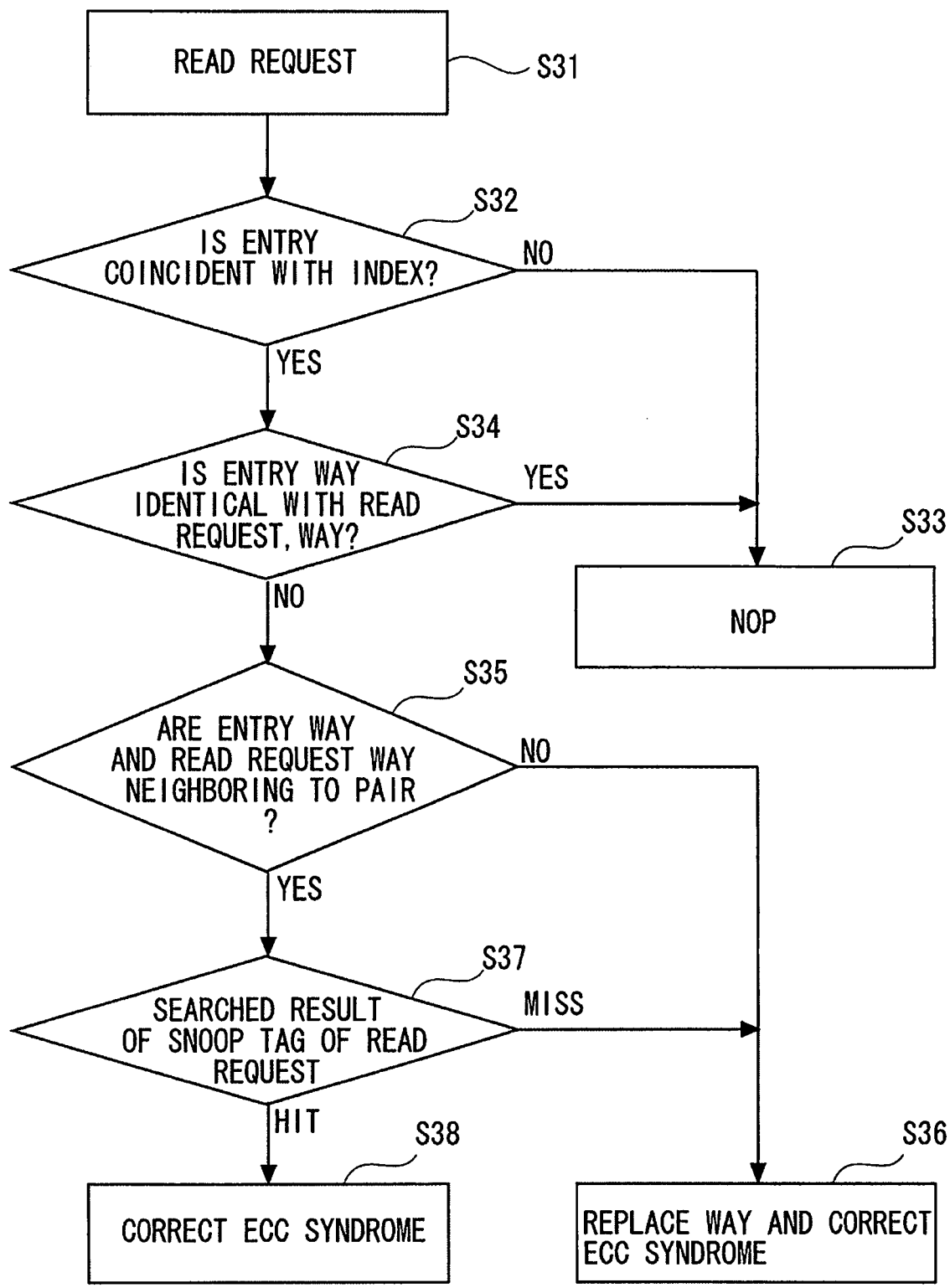
FIG. 7 is an explanatory diagram of a control method of a snoop tag.

Next, a specific configuration in the present embodiment will be described with reference to FIGS. 5-7. FIG. 5 is a schematic diagram illustrating components for pipeline-controlling the snoop tag (which correspond to a control device of the snoop tag) in the request control unit FLN according to the present invention.

As illustrated in FIG. 5, the request control unit FLN includes a searching unit 1, the queue 2, an index comparator 3, a WAY replacing unit 4, an ECC (Error Correcting Code) syndrome correction unit 5 and a snoop tag retaining unit 6.

The searching unit 1 performs operations such as acquiring information about the WAY corresponding to an address of the REPLACE request flowed to the pipeline from the CPU by reading this REPLACE request and searching through the snoop tag, determining whether or not the snoop tag contains the WAY information of the READ request, and conducting an ECC check of the information about the status and the address of the read WAY. Further, the searching unit 1 sends the thus-acquired WAY information and the ECC syndrome obtained when conducting the ECC check back to the pipeline.

The queue 2 gets stored with the REPLACE target WAY information and the index as an entry associated with the REPLACE request received from the processor.

The index comparator 3 compares the index stored in the queue 2 with an index of a subsequent READ request.

The WAY replacing unit 4 replaces, as a result of the comparison made by the index comparator 3, the REPLACE target WAY information of which the index gets coincident as will be described later on with the WAY information in the index-coincident entry in the queue.

The ECC syndrome correction unit 5, if one ECC is organized by a plurality of WAYS to the snoop tags, retains the ECC syndrome of the REPLACE target WAY of the READ request and, when executing the READ request-based process about the snoop tag, corrects the ECC syndrome corresponding to this process. Namely, when writing the READ request, the ECC syndrome correction unit 5 corrects, based on how the WAY information and the status are changed, the ECC syndrome so that the ECC of changed pieces of information remains correct after the change, and writes the corrected ECC syndrome to the snoop tag.

The snoop tag retaining unit 6 retains the snoop tag associated with a content of the cache memory of the processor. Note that in the snoop tag retaining unit 6, the single ECC is organized by the plural WAYS to the snoop tags.

A snoop tag control method in the thus-configured request control unit FLN will be described with reference to FIGS. 6 and 7.

To start with, when receiving the REPLACE request (S21), the queue 2 determines whether there is a free entry or not (S22).

If there is the free entry, the queue 2 determines whether or not the already-stored entry contains the same index (S23), and gets stored with, if the same index is not contained, the REPLACE target WAY information of the REPLACE request and the index as a new entry.

It is to be noted that if there is, it is determined in step 22, no free entry, and if the same index, it is determined in step 23, has already been contained, the REPLACE request is discarded (invalidated)(S25).

Then, when receiving the subsequent READ request (S31), the index comparator 3 compares the index already stored in the queue 2 with the index of the READ request (S32) and, if not coincident with each other, processes the READ request as usual because this READ request is not related to the stored REPLACE request (S33).

As a result of the comparison, if the indexes are coincident with each other, it is determined whether or not the WAY information of the entry is coincident with the WAY information of the READ request (S34), and, if these pieces of WAY information are the same, the processes (such as reading the information and updating the status) based on the READ request are executed as they are for the snoop tag because of no necessity of replacing the WAY and correcting the ECC syndrome (S33).

Whereas if the WAY information of the entry is different from the WAY information of the READ request, on the occasion of executing the READ request process with respect to the snoop tag, the ECC syndrome correction unit 5 corrects the ECC syndrome (S35-S38). In this case, at first, it is determined whether or not the WAY information retained in the index-coincident entry and the REPLACE target WAY information of the subsequent READ request are paired pieces of WAY information that organize the same ECC (S35), then the WAY replacing unit 4, if determined to be the paired pieces of WAY information organizing the same ECC, replaces the WAY information of the READ request with the WAY information retained in the index-coincident entry, and the ECC syndrome correction unit 5 corrects the ECC syndrome (S36).

Further, whereas if the WAY information is determined in step 35 not to be the paired pieces of WAY information organizing the same ECC, it is determined whether or not the result of the search made about the READ request in the searching unit 1 is hit or missed, i.e., it is determined whether or not the snoop tag contains the WAY information of the READ request (S37).

If the snoop tag does not contain the WAY information of the READ request, the WAY replacing unit 4 replaces the WAY information of the READ request with the WAY information retained in the index-coincident entry, and the ECC syndrome correction unit 5 corrects the ECC syndrome (S36). With this scheme, the WAY information of the READ request is not newly registered in the snoop tag, thereby preventing eviction.

Further, whereas if the snoop tag contains the WAY information of the READ request, it may be sufficient to simply update the status of the snoop tag, and hence the ECC syndrome correction unit 5 corrects the ECC syndrome without replacing the WAY (S38).

Thus, according to the present embodiment, when receiving the REPLACE request, the index thereof etc is entered in the queue 2 while the process of the REPLACE request is interrupted, in which status none of the index lock is therefore needed, and it is possible to promptly process the READ request of the same index and to improve the latency.

Still further, if the WAY of the REPLACE request gets different from the WAY of the READ request, the WAY information of the READ request is replaced by the WAY information of the REPLACE request, whereby the sweep-out of the snoop tag, which occurs due to the READ request, can be restrained, i.e., the eviction can be restrained.

The present invention is not limited to only the illustrated examples given above and can be, as a matter of course, changed in a variety of forms in the range that does not deviate from the gist of the present invention. Further, the components thereof can be combined to the greatest possible degree.

INCORPORATION BY REFERENCE

The disclosures of Japanese patent application No. JP2006-223626 filed on Aug. 18, 2006 including the specification, drawings and abstract are incorporated herein by reference.

What is claimed is:

1. A control device of a snoop tag, the control device comprising:
a snoop tag retaining unit to retain the snoop tag corresponding to a content of a cache memory of a processor;
a pipeline to receive requests including a replace request and a read request for access to the snoop tag;
a queue stored with an entry including a replace target way number and an index associated with the replace request received from the processor, the replace target way number indicating a way that is a replace target;
a comparator to compare the index included in the entry stored in the queue with an index in the read request when the read request is received; and
a replacing unit to replace a way number based on the read request with the replace target way number included in the entry stored in the queue, the entry including the index which has matched the index in the read request,
wherein when there is no free space in the queue upon receiving the replace request, none of the entry is stored in the queue, and the replace request is invalidated,
wherein when the queue is stored with an entry including the same index upon receiving the replace request, none of the entry is stored in the queue, and the replace request is invalidated,
wherein the entry stored in the queue is deleted after an elapse of a predetermined period, and
wherein when an index in a request is matched with an index in another request already existing on the pipeline, the request is canceled and retried, and, when the request is the read request containing the index which has matched the index included in the entry stored in the queue, the request is not canceled.

2. The control device according to claim 1, further comprising a correcting unit to retain, when one ecc is organized by the plurality of ways to the snoop tags, an ecc syndrome of the way number based on the read request, and to correct the ecc syndrome, when a process based on the read request is executed with respect to the snoop tag, corresponding to the process.

3. The control device according to claim 2, wherein the replacing unit replaces the way number based on the read request with the replace target way number included in the entry stored in the queue, when the replace target way number included in the entry stored in the queue and the way number based on the read request are paired pieces of way number organizing the same ecc and are not the same way number, the entry including the index which has matched the index in the read request.

4. The control device according to claim 2, further comprising a searching unit to search through the snoop tag and thus determining whether or not the way number based on the read request exists in the snoop tag,
wherein the correcting unit corrects the ecc syndrome on the basis of a status of the way, when the replace target way number included in the entry stored in the queue and the way number based on the read request are not paired pieces of way number organizing the same ecc and when it is determined from a result of the search that the way number based on the read request exists in the snoop tag, the entry including the index which has matched the index in the read request.

5. The control device according to claim 2, further comprising a searching unit to search through the snoop tag and thus determining whether or not the way number based on the read request exists in the snoop tag,
wherein the replacing unit replaces the way number based on the read request with the replace target way number included in the entry stored in the queue, when the replace target way number included in the entry stored in the queue and the way number based on the read request are not paired pieces of way number organizing the same ecc and when it is determined from a result of the search that the way number based on the read request does not exist in the snoop tag, the entry including the index which has matched the index in the read request.

6. A control method of a snoop tag, comprising:
receiving requests including a replace request and a read request for access the snoop tag in a pipeline,
storing, in a queue, an entry including a replace target way number and an index associated with replace request received from a processor, the replace target way number indicating a way that is a replace target;
comparing the index included in the entry stored in the queue with an index in the read request when the read request is received; and
replacing a way number based on the read request with the replace target way number included in the entry stored in the queue, the entry including the index which has matched the index in the read request,
wherein when there is no free space in the queue upon receiving the replace request, none of the entry is stored in the queue, and the replace request is invalidated,
wherein when the queue is stored with an entry including the same index upon receiving the replace request, none of the entry is stored in the queue, and the replace request is invalidated,
wherein the entry stored in the queue is deleted after an elapse of a predetermined period, and
wherein when an index in a request is matched with an index in another request already existing on the pipeline, the request is canceled and retried, and, when the request is the read request containing the index which has matched the index included in the entry stored in the queue, the request is not canceled.

7. The control method according to claim 6, wherein when one ecc is organized by the plurality of ways to the snoop tags, an ecc syndrome of the way number based on the read request is retained and is corrected, when a process based on the read request is executed with respect to the snoop tag, corresponding to the process.

8. The control method according to claim 7, wherein the way number based on the read request is replaced with the replace target way number included in the entry stored in the queue, when the replace target way number included in the entry stored in the queue and the way number based on the read request are paired pieces of way number organizing the same ecc and are not the same way number, the entry including the index which has matched the index in the read request.

9. The control method according to claim 7, wherein it is determined from searching through the snoop tag whether the way number based on the read request exists in the snoop tag, and the ecc syndrome is corrected based on a status of the way, when the replace target way number included in the entry stored in the queue and the way number based on the read request are not paired pieces of way number organizing the same ecc and when it is determined from a result of the search that the way number based on the read request exists in the snoop tag, the entry including the index which has matched the index in the read request.

10. The control method according to claim 7, wherein it is determined from searching through the snoop tag whether or not the way number based on the read request exists in the snoop tag, and the way number based on the read request is replaced with the replace target way number included in the entry stored in the queue, when the replace target way number included in the entry stored in the queue-and the way number based on the read request are not paired pieces of way number organizing the same ecc and when it is determined from a result of the search that the way number based on the read request does not exist in the snoop tag, the entry included the index which has matched the index in the read request.

11. An information processing system, comprising:

a processor including a cache memory;

a memory stored with information; and a control unit performing read/write control between the processor and the memory, the control unit including:

a snoop tag retaining unit to retain a snoop tag corresponding to a content of the cache memory of the processor;

a pipeline to receive requests including a replace request and a read request for access to the snoop tag;

a queue stored with an entry including a replace target way number and an index associated with replace request received from the processor, the replace target way number indicating a way that is a replace target;

a comparator to compare the index included in the entry stored in the queue with an index in the read request when the read request is received; and a replacing unit to replace a way number based on the read request with the replace target way number included in the entry stored in the queue, the entry including the index which has matched the index in the read request, wherein when there is no free space in the queue upon receiving the replace request, none of the entry is stored in the queue, and the replace request is invalidated, wherein when the queue is stored with an entry including the same index upon receiving the replace request, none of the entry is stored in the queue, and the replace request is invalidated, wherein the entry stored in the queue is deleted after an elapse of a predetermined period, and wherein when an index in a request is matched with an index in another request already existing on the pipeline, the request is canceled and retried, and, when the request is the read request containing the index which has matched the index included in the entry stored in the queue, the request is not canceled.

* * * * *